(12) United States Patent
Sathish

(10) Patent No.: US 8,756,002 B2
(45) Date of Patent: Jun. 17, 2014

(54) METHOD AND APPARATUS FOR CONDITIONAL PROVISIONING OF POSITION-RELATED INFORMATION

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/449,023

(22) Filed: Apr. 17, 2012

(65) Prior Publication Data

US 2013/0275039 A1    Oct. 17, 2013

(51) Int. Cl.
*G01C 21/30* (2006.01)
*G01C 21/32* (2006.01)

(52) U.S. Cl.
USPC ........................................ 701/409

(58) Field of Classification Search
USPC ........................................ 701/409
See application file for complete search history.

(56) References Cited

U.S. PATENT DOCUMENTS

| | | | |
|---|---|---|---|
| 6,452,544 B1 * | 9/2002 | Hakala et al. | 342/357.31 |
| 6,604,049 B2 * | 8/2003 | Yokota | 701/484 |
| 7,616,129 B2 * | 11/2009 | Thacher | 340/905 |
| 7,724,185 B2 * | 5/2010 | Syrjarinne et al. | 342/357.22 |
| 8,139,514 B2 * | 3/2012 | Weber et al. | 370/312 |
| 8,164,442 B2 * | 4/2012 | Ungari | 340/539.13 |
| 2002/0044152 A1 * | 4/2002 | Abbott et al. | 345/629 |
| 2002/0145984 A1 * | 10/2002 | Babu et al. | 370/312 |
| 2005/0184866 A1 * | 8/2005 | Silver et al. | 340/539.13 |
| 2005/0184868 A1 * | 8/2005 | Mercado et al. | 340/545.3 |
| 2007/0200713 A1 * | 8/2007 | Weber et al. | 340/573.1 |
| 2007/0287473 A1 | 12/2007 | Dupray | |
| 2009/0197620 A1 | 8/2009 | Choi et al. | |
| 2010/0182145 A1 | 7/2010 | Ungari | |
| 2011/0105092 A1 | 5/2011 | Felt et al. | |
| 2012/0166972 A1 * | 6/2012 | Weber et al. | 715/753 |

FOREIGN PATENT DOCUMENTS

| | | |
|---|---|---|
| WO | WO 2007/100740 A2 | 9/2007 |
| WO | 2009062176 A2 | 5/2009 |
| WO | 2010006062 A1 | 1/2010 |

OTHER PUBLICATIONS

Trackerhunter.com, Web Page, https://www.trackerhunter.com/en.
International Search Report for corresponding application No. PCT/FI2013/050382 issued Jul. 25, 2013, 6 pages.
Written Opinion of the International Searching Authority for corresponding application No. PCT/FI2013/050382 mailed Jul. 25, 2013, 7 pages.

* cited by examiner

*Primary Examiner* — Mary Cheung
*Assistant Examiner* — Michael Berns
(74) *Attorney, Agent, or Firm* — Ditthavong Mori & Steiner, P.C.

(57) ABSTRACT

An approach is provided for providing aggregated position-related information at a user interface based on invocation conditions. An invocation platform determines one or more applications, one or more services, or a combination thereof that provide position-related information. The invocation platform further determines one or more invocation conditions associated with the position-related information, the one or more applications, the one or more services, or a combination thereof. The invocation platform also causes, at least in part, a presentation of at least one user interface that aggregates the position-related information from the one or more applications, the one or more services, or a combination thereof based, at least in part, on the one or more invocation conditions.

18 Claims, 12 Drawing Sheets

METHOD AND APPARATUS FOR CONDITIONAL PROVISIONING OF POSITION-RELATED INFORMATION

BACKGROUND

Service providers and device manufacturers (e.g., wireless, cellular, etc.) are continually challenged to deliver value and convenience to consumers by, for example, providing compelling network services. One service includes providing a user's position and information regarding the position in a map-based user interface. Such a service may be used for providing directions between two locations or information regarding points of interest surrounding the current position of the user. Other services exist that similarly provide position-related information. Such a service may provide information to parents regarding the positions of their children on a map-based user interface. Applications and services related to providing position-based information usually have their own, separate user interfaces that a user must manually navigate to in order to see the position-based information. This adds a level of inconvenience to users that want to use multiple applications and/or services. Even further, not all of the applications and services are compatible with the wide range of user devices that may display the user-based information. Thus, there are no integrated services available that are capable of showing multiple maps associated with different applications. Further, the applications and services do not always present user position-related information. Rather, there could be multiple map applications that provide other map related services pertaining to locations other than current user location. Currently, such frameworks do not exist that allow multiple map applications related to a user to be dynamically invoked. Therefore, device manufacturers and service providers face significant technical challenges in providing a framework capable of integrating map-based applications and services within a single user interface that adapts to dynamic conditions associated with the availability of the position-related information.

SOME EXAMPLE EMBODIMENTS

Therefore, there is a need for an approach for providing aggregated position-related information at a user interface based on invocation conditions.

According to one embodiment, a method comprises determining one or more applications, one or more services, or a combination thereof that provide position-related information. The method also comprises determining one or more invocation conditions associated with the position-related information, the one or more applications, the one or more services, or a combination thereof. The method further comprises causing, at least in part, a presentation of at least one user interface that aggregates the position-related information from the one or more applications, the one or more services, or a combination thereof based, at least in part, on the one or more invocation conditions.

According to another embodiment, an apparatus comprises at least one processor, and at least one memory including computer program code for one or more computer programs, the at least one memory and the computer program code configured to, with the at least one processor, cause, at least in part, the apparatus to determine one or more applications, one or more services, or a combination thereof that provide position-related information. The apparatus is also caused to determine one or more invocation conditions associated with the position-related information, the one or more applications, the one or more services, or a combination thereof. The apparatus is further caused to present at least one user interface that aggregates the position-related information from the one or more applications, the one or more services, or a combination thereof based, at least in part, on the one or more invocation conditions.

According to another embodiment, a computer-readable storage medium carries one or more sequences of one or more instructions which, when executed by one or more processors, cause, at least in part, an apparatus to determine one or more applications, one or more services, or a combination thereof that provide position-related information. The apparatus is also caused to determine one or more invocation conditions associated with the position-related information, the one or more applications, the one or more services, or a combination thereof. The apparatus is further caused to present at least one user interface that aggregates the position-related information from the one or more applications, the one or more services, or a combination thereof based, at least in part, on the one or more invocation conditions.

According to another embodiment, an apparatus comprises means for determining one or more applications, one or more services, or a combination thereof that provide position-related information. The apparatus also comprises means for determining one or more invocation conditions associated with the position-related information, the one or more applications, the one or more services, or a combination thereof. The apparatus further comprises means for causing, at least in part, a presentation of at least one user interface that aggregates the position-related information from the one or more applications, the one or more services, or a combination thereof based, at least in part, on the one or more invocation conditions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing aggregated position-related information at a user interface based on invocation conditions are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
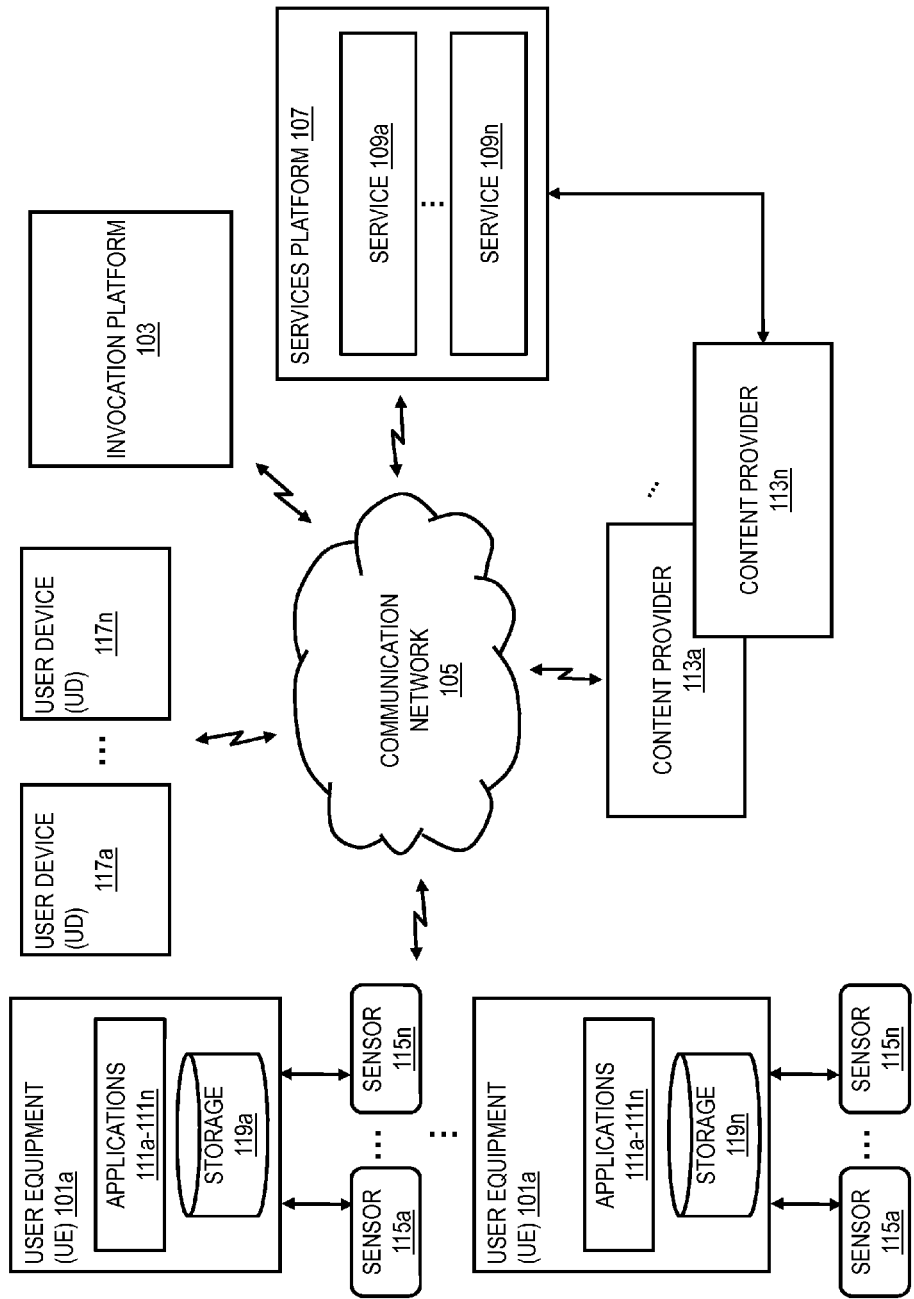
FIG. 1 is a diagram of a system capable of providing aggregated position-related information at a user interface based on invocation conditions, according to one embodiment.

FIG. 1 is a diagram of a system capable of providing aggregated position-related information at a user interface based on invocation conditions, according to one embodiment. As discussed above, service providers and device manufacturers have created services and devices that allow users to receive position-related information in a wide variety of settings. For example, a user may use their mobile device to receive global positioning system (GPS) information regarding their current location. A user may also use map information in their car while receiving driving directions between two locations. In certain circumstances, a parent may use a service that allows for tracking a child, such that the child's location is illustrated on a user interface associated with a specialty device. Although certain devices may allow for the presentation of different position-related information, the presentations are typically associated with, for example, different applications and/or services that are rendered associated with different maps. Even further, users must manually switch between the different applications and/or services to receive the position-related information. For instance, if a parent is currently driving between two locations and receiving directions on a mobile device, to see position-related information regarding children requires switching to a different application and/or service at the device, or switching to a different device altogether. Thus, there is no framework that allows for the integration of multiple applications and/or services that allow for the presentation of different position-related information.

Further, user interfaces associated with the applications and services are active regardless of whether there is actually position-related information being generated by the applications and service. For example, where the tracking device used to track the location of a child is turned off (e.g., not generating position-related information), the user interface associated with the service may still display a map but the map does not include any position-related information. Thus, a user may potentially navigate to the user interface only to see that no position-related information is currently presented at the user interface. Thus, there also is no framework that allows for the automatic presentation of the position-related information corresponding to the applications and/or services based on certain conditions such that, for example, the user does not need to manually start or navigate to a particular application and/or service at a device.

To address these problems, a system 100 of FIG. 1 introduces a framework capable of integrating applications and/or services that provide position-related information within a single user interface associated with, for example, a single device based on dynamic invocation conditions. The system 100 introduces the capability to determine applications, services, or combinations thereof that provide position-related information. The system 100 allows for the integration of any type of application or service thus reducing the need for different devices, for example, to provide the different position-related information. The system 100 further determines invocation conditions associated with the position-related information, the applications, the services, or a combination thereof that control the presentation of position-related information at a user interface. The invocation conditions may define certain conditions, based on, for example, context information, that are associated with the invocation of certain applications, services, or presentations of information at a device. By way of example, and as discussed in detail below, an invocation condition may be a GPS transmitter turning on that allows for the tracking of a GPS device. The system 100 also allows for the presentation of a user interface that aggregates position-related information from the applications, services, or combinations thereof based on the invocation conditions. The aggregation of the position-related information allows for the presentation of all position-related information from the applications and the services at a single user interface associated with, for example, a single device automatically on the basis of the satisfaction of the invocation conditions. Thus, such a framework allows for the user to focus more on understanding the position-related information, provides position-related information more efficiently, and lets the user also multi-task without having to expend additional effort by, for example, manually switching between applications, services, and/or devices.

As shown in FIG. 1, the system 100 comprises user equipment (UE) 101a-101n (collectively referred to as UE 101) having connectivity to an invocation platform 103 via a communication network 105. Although multiple UE 101 are illustrated, in one embodiment, the system 100 may have only one UE 101. The UE 101 may be any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111a-111n (collectively referred to as applications 111). The applications 111 may be any type of application, such as one or more navigation applications, personal organizer applications, calendar applications, e-mail applications, gaming applications, reminder applications, Internet browser applications, etc. The applications may provide position-related information at the UE 101. By way of example, a navigation application 111a may provide position-related information regarding the current position of a user of a UE 101a. The navigation application 111a may also provide position-related information to a user regarding walking and/or driving directions between two geographical locations. The navigation application 111a may provide the information associated with a map such that the user can see their current position and/or driving directions in relation to their surrounding environment. In one embodiment, one of the applications 111 may be associated with the invocation platform 103, such as a map client. Thus, the map client, also referred to as an invocation platform application 111n, may interface with the invocation platform 103 to present the aggregated position-related information at a user interface associated with a device.

In one embodiment, one or more of the applications 111 may interface with one or more services 109a-109n (collectively referred to as services 109) provided by a services platform 107. The services 109 may provide position-related information associated with one or more services provided by the services platform 107. The services 109 may include, for example, one or more social networking services, one or more tracking services, one or more navigation services, one or more reminder services, one or more calendar-based services, one or more advertisement services, etc. By way of example, a social networking service 109a may provide information regarding the locations of other users (e.g., friends, buddies, etc.) on a map so that a user may see where his or her friends are in relation to the map. The social networking service 109a may interface with the invocation platform 103 to provide the information aggregated at the UE 101. Other services 109 may have similar relationships with the invocation platform 103 to provide aggregated position-related information to the UE 101. By way of another example, an advertisement service may provide one or more advertisements correlated to geographical locations. The advertisements correlated to the geographical locations may represent position-related information that may be aggregated and presented at a user interface.

The UE 101 may also include storages 119a-119n (collectively referred to storage 119). The storage 119 may store information at the UE 101 regarding any one or more of the applications 111 and/or the services 109. In one embodiment, the storage 119 may store map information, including one or more maps that are used to provide the presentation of the position-related information in relation to maps at the UE 101. In such an embodiment, for example, the storage 119 may include all the map information required to display the position-related information rather than the UE 101 having to receive the map information from another source over the communication network 105. In such an embodiment, the resources of the UE 101 are not unnecessarily consumed by receiving the map information. The invocation platform application 111n may use one or more maps stored in the storage 119 for presenting the position-related information.

The UE 101 may also include or be associated with (e.g., in communication with) one or more sensors 115a-115n (collectively referred to as sensors 115). The sensors 115 may collect context information regarding the UE 101 and/or the users of the UE 101. By way of example, the sensors 115 may include a light sensor, a pressure sensor, a humidity sensor, one or more location/position sensors, etc. The context information collected by the sensors 115 may be processed by the invocation platform 103 to determine whether one or more invocation conditions are satisfied, which may then be correlated to determining to present corresponding position-related information.

The system may further include one or more user devices (UD) 117a-117n (collectively referred to as UD 117). One kind of UD 117 may be a location transmitting device, such as a device that transmits its location based on one or more location determining services (e.g., GPS). For example, a location transmitting device may include a GPS enabled wrist watch that may transmit its location to a service 109 and/or application 111. Another location transmitting device may include a probe or tracking device whose only function is to transmit the location to a service 109 and/or application 111. Another kind of UD 117 may be a device that presents map-related information that is not necessarily a UE 101. For example, a car may include a navigation system. The navigation system includes a display that presents a user interface that displays map information. The navigation system may determine the location of the car and present the location on the display. Although the navigation system may not technically qualify as a UE 101, the navigation system can similarly communicate over the communication network 105 to other UD 117, UE 101, the invocation platform 103, and the services 109 at the services platform 107 to present aggregated position-related information at a user interface.

The system 100 may also include one or more content providers 113a-113n (collectively referred to as content providers 113) that provide content to the UE 101, the invocation platform 103, the services 109, and/or the UD 117. The content may be any type of content, such as multimedia content (e.g., images, videos, audio, etc.), map-based content (e.g., one or more maps, etc.), social networking content (e.g., information posted on social networking websites, etc.), and the like. In one embodiment, although the storage 119 on the UE 101 may include the map information for presenting maps at user interfaces of the UE 101, the content providers 113 may provide the initial map information or may provide updates to the information to accommodate the position-related information that is supplied by one or more applications and/or services.

The invocation platform 103 of the system 100 provides the ability for the system 100 to aggregate position-related information at a user interface based on invocation conditions. The invocation platform 103 effectively provides a container application at the UE 101 and/or UD 117 that allows a user to view aggregated position-related information provided by different applications and/or services. The invocation platform 103 allows for switching between views of different position-related information using user interface features. In one embodiment, the user interface features may include one or more tabs, one or more icons, or a combination thereof. However, multiple different user-interface switching paradigms may be used by the invocation platform 103 for switching between position-related information associated with the applications and/or services.

The invocation platform 103 may dynamically present the position-related information at a user interface that aggregates the position-related information from one or more applications and/or one or more services based on one or more invocation conditions. Thus, although a user may be associated with ten or more applications and/or services that have been registered with the invocation platform 103, the position-related information associated with the applications and/or services is presented based on the invocation conditions, which, for example, may be considered as being when the applications or services are active. Accordingly, the users do not have to open third-party applications or services to access the position-related information. Rather, the position-related information is automatically and dynamically presented at a user interface when the applications and/or services become active, or, in one embodiment, when the position-related information becomes active. In a sense, the invocation platform 103 allows for the presentation of position-related information to act as a kind of notification to the user, in addition to presenting the substance of the position-related information.

By way of example, user A may want to monitor the position of person B, such as where user A is the parent of person B. Person B may be wearing a GPS enabled watch that starts transmitting location data once the GPS in the watch is activated (e.g., turned on). Once the GPS in the watch is activated, the invocation platform 103 may determine the presence of position-related information associated with the watch. Thus, in one embodiment, an invocation condition may be based on whether the location of the watch is activated. Upon the location technology within the watch being activated, the invocation condition is satisfied and the invocation platform 103 causes the presentation of the position-related information (e.g., the location data) at a user interface associated with UE 101 and/or a UD 117. From then, the movement of person B may be monitored based on the user interface associated with the UE 101 and/or the UD 117.

In one embodiment, a user may have multiple UE 101 and/or UD 117 associated with the invocation platform 103. The devices may have the same priority or may have different priority rankings By way of example, a UE 101 may have a higher priority than a UD 117. If both devices attempt to access the invocation platform 103 through the invocation platform application 111n, the invocation platform 103 may only interface with the UE 101. However, if the UE 101 stops accessing the invocation platform 103 (e.g., turns off), the invocation platform 103 may begin interfacing with the lower priority UD 117. The invocation platform 103 may provide an automatic migration of the position-related information and user interface from the UE 101 to the UD 117 once the UE 101 turns off and the UD 117 becomes the highest ranked device.

By way of example, user A may have a UE 101 and a UD 117 registered with the invocation platform 103. The UD 117 may be a navigation system within an automobile and may have a higher rank than the UE 101 based on, for example, the need for the user to pay attention to driving (and the navigation device associated with driving) and not the UE 101. Thus, while the invocation platform 103 is presented position-related information at a user interface of the UE 101, if the user starts the car and the navigation system in the car, the invocation platform 103 may detect the navigation system turning on and automatically migrate the presentation of the position-related information at the UE 101 to the navigation system of the car. In one embodiment, the position-related information associated with person B may be presented on the same map as the map used for the navigation presented by the navigation system. In one embodiment, the invocation platform 103 may present, for example, tabs to allow user A to switch between the map associated with the navigation presented by the navigation system and a map associated with the position information of person B. Thus, although different maps may be used, the same user interface of the navigation system presents the information. If, at the time user A starts the car, the watch for person B is not activated, then there is no additional position-related information associated with the watch for the invocation platform 103 to present, and the user interface associated with the navigation system will not include the additional tab associated with the position of the watch.

Based on the system 100, a user may register multiple third party applications and/or services that provide position-related information that are associated with the user. A user may choose from one or more compatible applications and/or services that may be registered with the invocation platform 103. In one embodiment, compatible may mean that the applications and/or services are compatible with one or more protocols supported by the invocation platform 103, including authentication and security, where applicable. When registering an application and/or service, the user may provide the following exemplary information: authentication information, devices that may provide position-related information, one or more applications and/or services that provide invocation criterion, permission to provide device profile and context information (and type of context information), priority order associated with the devices where multiple devices are registered, and whether multiple devices may concurrently receive the position-related information. In general, all communications between applications and/or services that provide position-related information to the UE 101 and/or the UD 117 will occur through the invocation platform 103. Under this approach, the invocation platform 103 may provide a better experience and have better control over the applications and/or services. However, in one embodiment, the invocation platform 103 may direct communication directly between the applications and/or services and the UE 101 and/or UD 117.

In one embodiment, for each application and/or service a user provides, the user may also provide authentication information. The invocation platform 103 may then provide the authentication information to the application and/or service to connect to the application and/or service and retrieve the information associated with the user (e.g., position-related information). Once the information is obtained, the invocation platform 103 may present the aggregated information at a user interface associated with the user rather than the applications and/or services presenting the information at separate user interfaces. The authentication information may consist of a login name and password, an authentication token, and the like. By providing the authentication information, the user provides the invocation platform 103 permission to contact the applications and/or services and gather application information and/or service information associated with the user for providing position-related information. The authentication information protects the privacy of the user because the invocation platform 103 may access only applications and/or services that the user provides authentication information for, as well as protect the invocation platform 103 from other applications and/or services that are not registered with the invocation platform 103 by preventing direct access to the invocation platform 103 and/or the UE 101.

In one embodiment, the position-related information may be associated with a third party (e.g., not the user using the invocation platform 103). In such an embodiment, the user may provide the invocation platform 103 with authentication information, or instructions to acquire authentication information, for the invocation platform 103 to gain permission to obtain the position-related information regarding the third party. The invocation platform 103 may contact the third party to obtain the authentication information required to track the position of the third party. The request for authentication information may be executed using one or more of the services 109 (e.g., through the use of a social networking service by sending a message requesting the authentication information from the third party). Thus, authentication information may be provided associated with the user of the invocation platform 103, and associated with third-party users that the user wishes to track. Authentication information may also be used to authenticate the user associated with the invocation platform 103 when requesting authentication information from a third party to, for example, track the third party.

The application information and/or service information may include, for example, location data, map data (e.g., range of map, resolution of map, etc.), map display information, overlay display information (if applicable), information regarding the various levels of map information, user information, service conditions and/or changes to service conditions, service configuration information, user interface information (e.g., in-frame or default information), full application user interface information (e.g., user interface skin information, if supported), etc. With respect to map resolutions, for example, some map resolutions may not be available to third party applications and/or services because of, for instance, business/contractual reasons. The invocation platform 103 will have this information to properly display the position-related information on a user interface.

In one embodiment, the invocation platform 103 may send information to the applications and/or services regarding details of the user, the UE 101, the UD 117, and/or the map client at the UE 101 and/or UD 117 (e.g., the invocation platform application 111*n*). This information may include, for example, a version of the map client, URL or namespace of map client version, whether skins are supported, whether third party user interface is possible, whether in-frame user interface is possible, user interface paradigm employed by map client, basic set of expected data (e.g., central location, rage of map, resolution of map, etc.), layer data support for map client and format supported, data format supported, frame size for map client (e.g., in both portrait and landscape modes), and whether live tiles are supported by client for the home screen, along with update time for live tiles. The live tiles may present thumbnail information for the applications and/or services, if supported. In one embodiment, each application may be provided a time slot for showing information at a live tile. In one embodiment, separate tiles may become active on a live home screen of the UE 101 and/or UD 117 if permission is granted by the user.

The invocation conditions may differ between applications and/or services. In one embodiment, applications and/or services registered with the invocation platform 103 may have form fields that are filled in by the user associated with the invocation condition. For example, for the situation of the watch example above, a service associated with the watch may have the invocation condition provided by the user as Device ON. Accordingly, whenever the watch is turned on, the invocation condition is satisfied and position-related information may be transmitted by the invocation platform 103 to the device associated with user A.

In one embodiment, invocation conditions may be associated with the application and/or service side, such as the above watch example, or may be associated with the user side (e.g., user A). Context information may be processed to determine whether one or more invocation conditions are satisfied with a user A. For instance, if a user proceeds from his home to his car, the context information may indicate that the user is now in his car. This could be an invocation condition associated with a particular application and/or service or the presentation of position-related information associated with an application and/or service. As discussed above, this could also be a general invocation condition to switch from presenting the position-related information at a UE 101 to instead at a UD 117 (e.g., car navigation system). The context information may also be tied to one or more applications 111 executed at the UE 101. For example, a personal organizer application 111*b* may include a reminder to user A to check on whether user A's parent (persons C and D) are going to the doctor's office during a certain day and time. Upon the day and time occurring, the day and time satisfying the day and time of the reminder may activate the invocation platform 103 to begin presenting position-related information associated with persons C and D at a user interface of a UE 101. Thus, the map client will dynamically become active corresponding to the date and time of the reminder and user A can verify that persons C and D are actually at the doctor's office during the given time period.

Communications between the UE 101, the UD 117, the invocation platform 103, the applications and/or services may occur through both synchronous and asynchronous signaling and any communication protocol capable of data transmission, control and signaling may be used. Some example may include Sessions Initiated Protocol (SIP), Simple Object Access Protocol (SOAP) of SIP, Representational State Transfer (RESTful) services, Extensible Markup Language (XML), payloads, remote invocation (Remote Method Invocation (RMI), Common Object Request Broker Architecture (CORBA), web services, etc.

In one embodiment, the invocation platform application 111n may receive context information from the invocation platform 103, one or more sensors 115, and/or one or more applications 111 at the UE 101 and the invocation platform application 111n may monitor the context information for changes. If the changes satisfy one or more invocation conditions, the map client (e.g., invocation platform application 111n) may signal the invocation platform 103 that the invocation conditions are satisfied and the invocation platform 103 will interface with the appropriate application or service to retrieve the position-related information to transmit to the UE 101. However, in one embodiment, the invocation platform 103 may directly determine the context information and monitor the context information for changes that satisfy invocation conditions. Further, in one embodiment, the applications and/or services may indicate to the invocation platform 103 that certain invocation conditions have been met. By way of example, where the watch in the above example turns on, the service that is associated with provisioning position-related information associated with the watch may interface with the invocation platform 103 to indicate that the invocation condition of the watch turning on is satisfied and also provide the position-related information.

In one embodiment, a service may provide for sharing information between users. The information may consist of multimedia files (e.g., audio, videos, images, etc.). An invocation condition may be associated with whether there are multimedia files ready to be shared with a user. Further, in one embodiment, the service may provide security measures such that a user may only view the files if the user is at a designated location. In such an example, the invocation condition may be satisfied when there are multimedia files ready to be shared. The position-related information that may be presented to the user may be information associated with where the user must be located to be able to view the multimedia files. A service may also provide advertisement information. The position-related information may correspond to the locations associated with the advertisements. The invocation conditions may be associated with whether there are currently advertisements to be presented to a user.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

By way of example, the UE 101, the invocation platform 103, the services platform 107, the content providers 113, and the UD 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
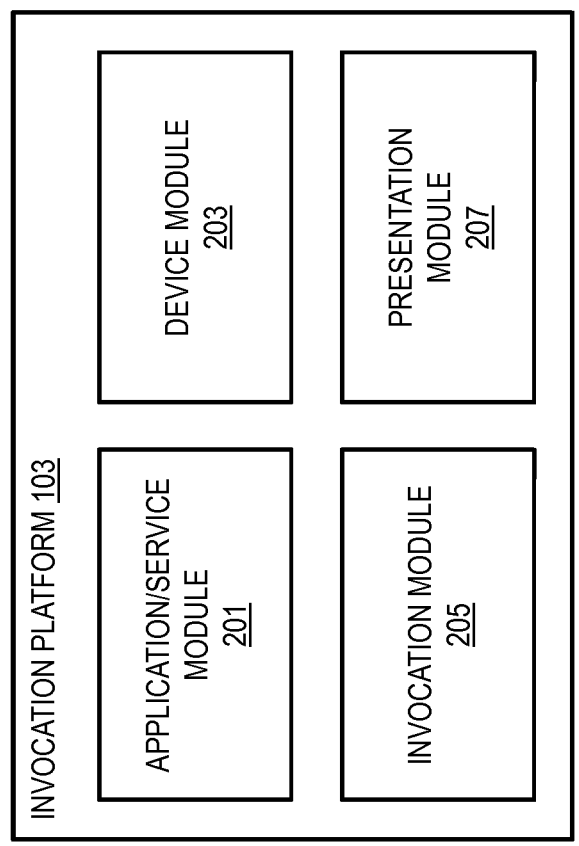
FIG. 2 is a diagram of the components of an invocation platform 103, according to one embodiment.

FIG. 2 is a diagram of the components of an invocation platform 103, according to one embodiment. By way of example, the invocation platform 103 includes one or more components for providing aggregated position-related information at a user interface based on invocation conditions. It is contemplated that the functions of these components may be combined in one or more components or performed by other components of equivalent functionality. By way of example, the functions of the invocation platform 103 may be performed by one or more applications 111 at the UE 101, one or more hardware module at the UE 101 and/or the UD 117, or at one or more services 109. In this embodiment, the invocation platform 103 includes an application/service module 201, a device module 203, an invocation module 205, and a presentation module 207.

The application/service module 201 determines the applications and/or services that are associated with position-related information that is aggregated at a user interface by the invocation platform 103. In one embodiment, one or more applications and/or services may be already registered at the invocation platform 103. In this embodiment, a user may select one or more of the applications and/or services associated with one or more user interfaces and/or devices so that aggregated position-related information is presented at a user interface associated with the devices. In such an embodiment, the invocation platform 103 may already have determined the information that is transmitted to the applications and/or services to provide the position-related information at a UE 101 and/or UD 117. In such an embodiment, the invocation platform 103 may already have determined invocation conditions associated with the applications and/or services for determining when to present position-related information at the UE 101 and/or the UD 117. However, in one embodiment, a user may further define or control the invocation conditions.

In one embodiment, a user may register one or more applications and/or services with the invocation platform 103 through the application/service module 201. In such an embodiment, the user may define the information that is requested by the applications and/or services, and the information that is requested by the invocation platform 103, as well as any authentication information, if applicable, to provide the position-related information at a UE 101 and/or UD 117. The user may also define the invocation conditions associated with the applications and/or services to automatically present the position-related information at the UE 101 and/or UD 117.

In one embodiment, the user may rank the applications and/or services according to a priority ranking The application/service module 201 may determine the ranking based on one or more inputs by the user. The application/service module 201 may then control what applications and/or services provide position-related information at the user interface of the device based on the priority ranking By way of example, an application may provide position-related information according to navigation information. The application may have a priority ranking of 2. A service may provide position-related information associated with a tracking probe. The service may have a priority ranking of 1, which is higher than the priority ranking of the application. Accordingly, the invocation platform 103 may provide position-related information associated with the service over the application in situations where the user requests a prioritized presentation of the position-related information. In one embodiment, for example, where an invocation condition associated with the service becomes satisfied (e.g., when the tracking probe turns on), the invocation platform 103 may automatically change the presentation of the user interface to include the position-related information of the service rather than the position-related information of the application based on the priority ranking and the service initially becoming ctive. By way of example, the user may place more importance on receiving the position-related information of the service rather than the position-related information of the application.

The device module 203 determines one or more devices that may be associated with the presentation of position-related information. The user may register one or more devices with the invocation platform 103 based on the device module 203. In one embodiment, the device module 203 includes one or more previously registered devices, or device types, that may be selected by a user to associate with the user. In one embodiment, the user may enter information about a device and register the device with the device module 203. The user may register a device that is compatible with the device module 203 and the invocation platform 103. Compatibility may be based on, for example, whether the device is compatible with one or more protocols that the invocation platform 103 is compatible with, such as SIP, SOAP over SIP, RESTful services, XML payloads, remote invocations (RMI, CORBA), web services, etc.

In one embodiment, the device module 203 may rank one or more devices associated with a user based on a priority ranking A user may define a priority ranking associated with the devices such that the invocation platform 103 may cause a presentation of a user interface at a specific one of the devices over a user interface of the other devices. For example, a user may have a mobile phone (e.g., a UE 101) and a car navigation system (e.g., UD 117) registered with the invocation platform 103 and may define the mobile phone as having a lower priority than the car navigation system. Thus, when the device module 203 determines that both the mobile phone and the car navigation system are active, the device module 203 may determine to present at the user interface of the car navigation device rather than the mobile phone based on the priority ranking of the car navigation device over the mobile phone.

The invocation module 205 determines one or more invocation conditions associated with position-related information, one or more applications, one or more services, or a combination thereof and determines whether the one or more invocation conditions are satisfied. In one embodiment, the invocation module 205 may collect and/or receive context information associated with one or more UE 101, one or more UD 117, one or more users of the UE 101, one or more users of the UD 117, or a combination thereof to determine whether the invocation conditions are satisfied. The invocation module 205 may also collect and/or receive context information from one or more sensors 115 associated with the one or more UE 101. The context information may be any type of information based on context, such as position information, time information, activity information, etc. In one embodiment, the invocation module 205 may also determine behavior information, preference information, and the like regarding a user and use this information to determine whether one or more invocation conditions are satisfied. By way of example, the context information may be associated with the location of a user, such as at work, at home, in a car, in a bus, etc. An invocation condition may be satisfied with the user at one of the listed locations. Additionally, an invocation condition may be satisfied based on context information indicating a behavior and/or a preference of a user being satisfied.

The invocation module 205 may also process application information. The application information may include one or more instructions associated with providing position-related information. By way of example, a reminder application may include one or more reminders to track location-based objects. The reminder application may then transmit application information to the invocation module 205 indicating that an invocation condition (e.g., time to track objects) is satisfied. The application information may be associated with one or more applications 111 at the UE 101, and therefore come from the user side of the system 100.

The invocation module 205 may also process service information. The service information may include one or more instructions associated with providing position-related information to a user. By way of example, a service may be associated with a location tracking probe. When the service determines that the location tracking probe is activated, the service may provide service information to the invocation module 205 indicating that an invocation condition (e.g., that the tracking probe is turned on) is satisfied. The service information may be associated with one or more services 109 at the services platform 107, and therefore come from a third-party side of the system 100. Accordingly, the invocation module 205 processes the context information, the application information, and the service information to determine whether the one or more invocation conditions are satisfied.

The presentation module 207 causes a presentation at a user interface of a device of the aggregated position-related information from the one or more applications and/or services. The presentation module 207 may provide one or more indicators representing the one or more applications or services at the user interface to allow a user to switch between the position-related information at the user interface. The presentation module 207 may also present the position-related information as different layers presented on a map to allow for presenting any one or more of the layers at a single time. The presentation module 207 may presented the user interface illustrated in FIG. 9, as discussed below.

Figure 3:
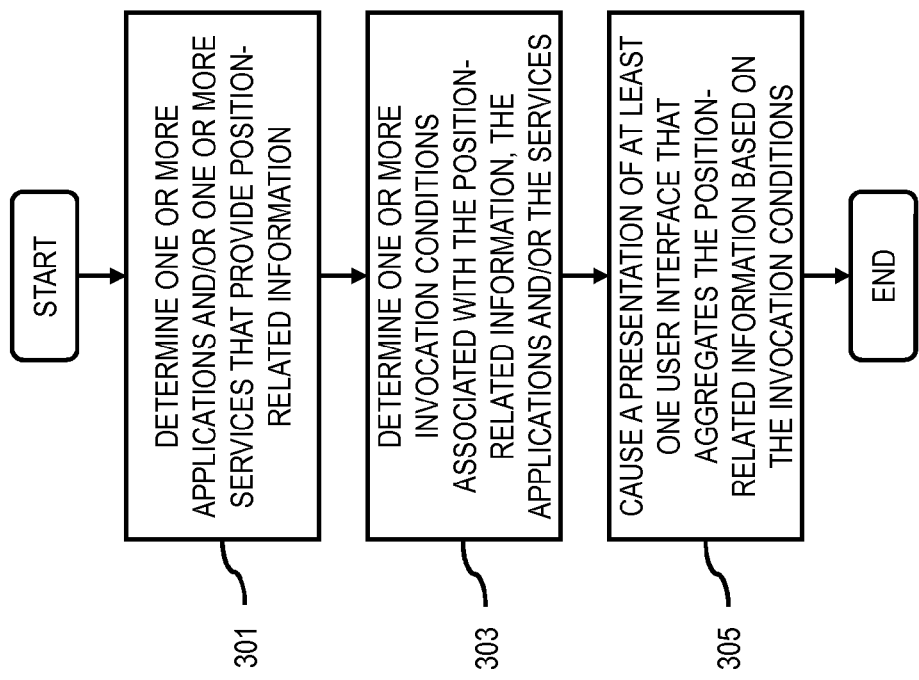
FIG. 3 is a flowchart of a process for providing aggregated position-related information at a user interface based on invocation conditions, according to one embodiment.
Figure 11:
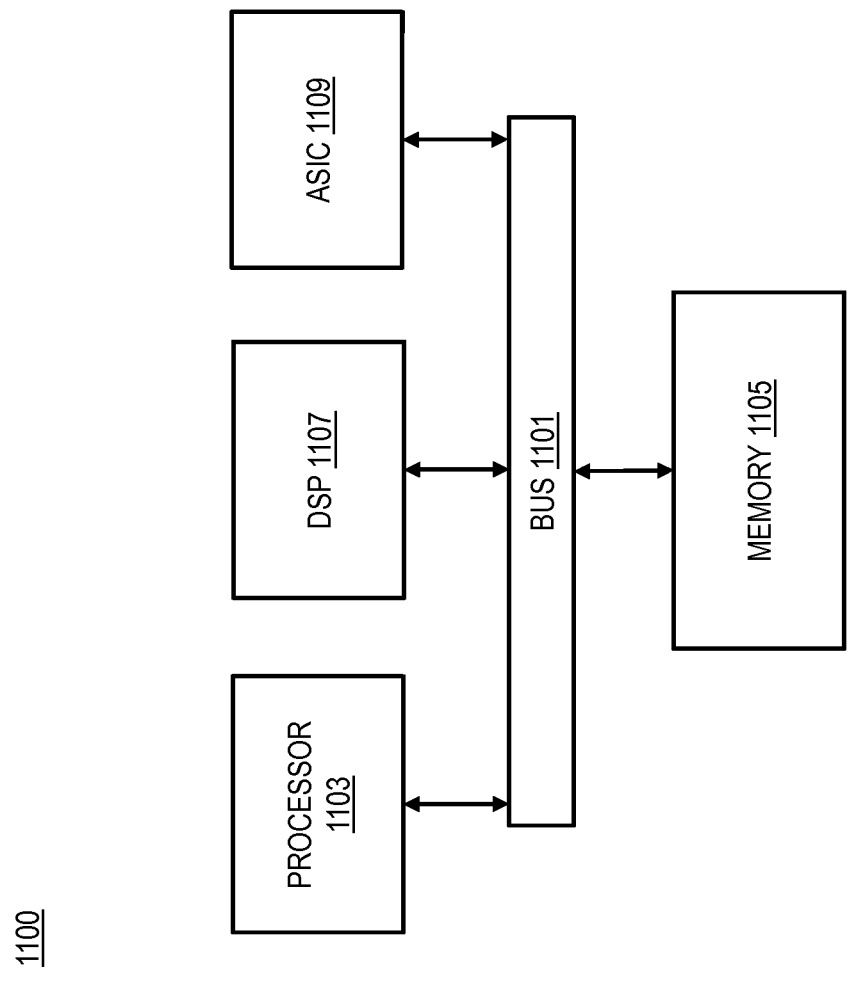
FIG. 11 is a diagram of a chip set that can be used to implement an embodiment of the invention.

FIG. 3 is a flowchart of a process for providing aggregated position-related information at a user interface based on invocation conditions, according to one embodiment. In one embodiment, the invocation platform 103 performs the process 300 and is implemented in, for instance, a chip set including a processor and a memory as shown in FIG. 11. In step 301, the invocation platform 103 determines one or more applications, one or more services, or a combination thereof that provide position-related information. The applications and services may be associated with a particular user or with one or more devices. The applications may be executed at the UE 101 (e.g., applications 111), or may be executed at another device (e.g., UD 117 or devices associated with the services 109 and/or content providers 113, such as servers, etc.). The invocation platform 103 may determine the applications and services that provide position-related information based on one or more signals from the applications and/or services indicating that the applications and/or services are currently active. The invocation platform 103 may also determine the applications and services based on one or more signals from the UE 101 and/or the UD 117 indicating (e.g., requesting) to monitor certain applications and/or services.

The position-related information may be any type of information that is associated with positional or location data. The position-related information may include, for example, tracking information associated with a device, notification information associated with a specific location where information is locally available or where information is accessible when the user is at the location, gaming information, such as a treasure hunt information with the location data represented by clues, treasure and other members' locations, and the like. However, the position-related information is not limited to these above examples. The position-related information can be any type of information that can be correlated to location or positional information.

In step 303, the invocation platform 103 determines one or more invocation conditions associated with the position-related information, the one or more applications, the one or more services, or a combination thereof. The invocation conditions may be associated with the applications and services that were determined in step 301. For the applications and services determined in step 301, the invocation platform 103 determines the associated invocation conditions that are associated with when the invocation platform 103 causes a presentation of the position-related information. If the user selects the applications and services from a list, or enters information regarding the applications and services, the information regarding the applications and services will also include information regarding the invocation conditions.

By way of example, the invocation conditions may include whether a device (e.g., tracking probe, GPS enabled watch, etc.) is activated, whether a UD 117 (e.g., car navigation system) is activated, whether a reminder, appointment, or other function related to an application is activated. For instance, an invocation condition may be associated with a reminder in a calendar application, the reminder pertaining to a doctor's appointment associated with individuals related to the user of the device. The invocation condition may also be associated with a GPS watch turning on and providing position-related information to the invocation platform 103 to be presented to a UE 101 or a UD 117.

In step 305, the invocation platform 103 causes, at least in part, a presentation of at least one user interface that aggregates the position-related information from the one or more applications, the one or more services, or a combination thereof based, at least in part, on the one or more invocation conditions. The at least one user interface may be a user interface associated with a UE 101 or a UD 117, and specifically may be associated with the map client (e.g., the invocation platform application 111a) running at the UE 101 and/or UD 117. Thus, the invocation platform 103 may cause a single user interface at the UE 101 or the UD 117 to present aggregated position-related information from a combination of applications and services such that the user can see the position-related information from the combination of applications and services without having to switch between user interfaces or various applications. The position-related information is also presented based on the invocation conditions determined above in step 303 such that the information is presented dynamically and automatically based on the invocation conditions. This allows the user to focus on a primary task while still being able to view the position-related information aggregated from across multiple different applications and services. Further, the user is not required to determine whether position-related information is available from the applications and/or services and to manually switch to the user interfaces associated with the applications and services.

The invocation platform 103 may also use one or more invocation conditions to determine to remove the position-related information associated with the one or more applications, the one or more services, or a combination thereof from the user interface. By way of example, there may be an invocation condition associated with removing the presentation of position-related information associated with an application that is satisfied when, for instance, the application is closed. In the example associated with a GPS enabled watch, an invocation condition associated with removing the presentation of position-related information from the user interface may occur when the watch is turned off or when the tracking ability associated with the watch is turned off. When an application is associated with position-related information, an invocation condition associated with removing the presentation of the position-related information may occur based on a condition being satisfied, such as the expiration of a period of time. For example, where a reminder was set to track position-related information for a period of time, the beginning of the period of time may be associated with an invocation condition to begin presenting the position-related information, and the end of the period of time may be associated with an invocation condition to end presenting the position-related information. Accordingly, the invocation platform 103 may dynamically and automatically present and remove aggregated position-related information from across many different applications and/or services at a user interface based on the invocation conditions.

Figure 4:
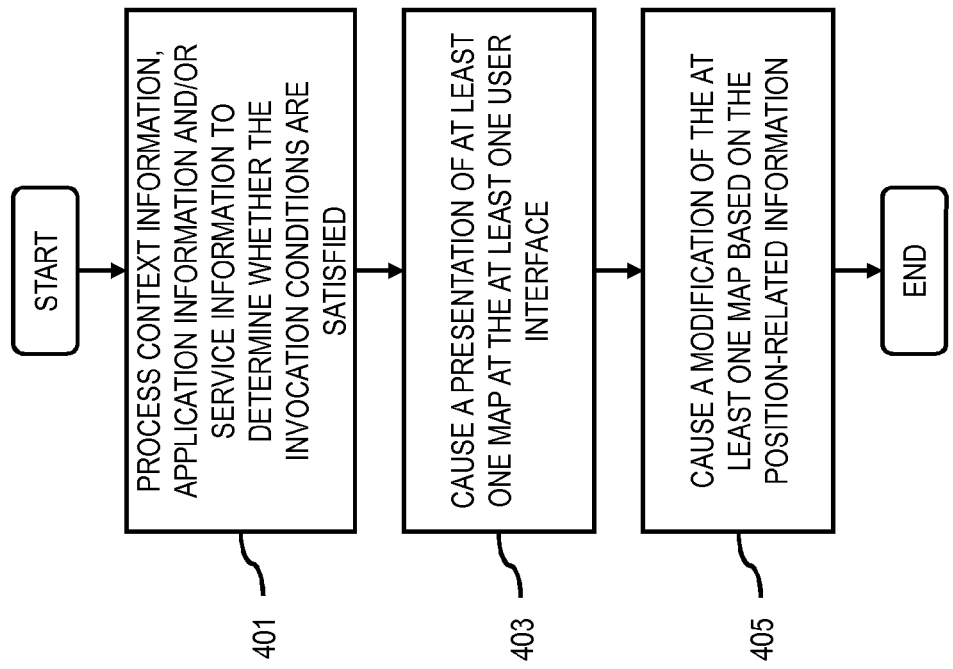
FIG. 4 is a flowchart of a process for modifying a map based on position-related information, according to one embodiment.

FIG. 4 is a flowchart of a process for modifying a map based on position-related information, according to one embodiment. In one embodiment, the invocation platform 103 performs the process 400 and is implemented in, for instance, a chip set including a processor and a memory as shown in FIG. 11. In step 401, the invocation platform 103 processes context information, application information associated with the one or more applications, service information associated with the one or more services, or a combination thereof to determine whether the one or more invocation conditions are satisfied. The context information may be any type of information associated with the devices of system 100, the users of the devices, the behaviors of the users, the preferences of the users, or a combination thereof. The context information may be associated with location information, such as the position of a user at a specific time. Thus, the context information may indicate if a user is at home, at the office, traveling, etc. The context information could be associated with the weather, the time of day, day of the week, month of the year, presence of other users and/or devices around a specific user and/or device, whether a device is currently connected to one or more other devices or a wireless hotspot, etc. Thus, the context information may be a wide variety of information.

Further, the application information may cover a wide variety of information. The application information may be associated with one or more functions of one or more applications 111 executed at the UE 101. For instance, an application may be a game that provides position-related information. An application also may be a calendar application or a reminder application that reminds a user of an activity or even that is associated with position-related information.

The service information also may cover a wide variety of information. In one embodiment, the service information may include context information that a UE 101 and/or a UD 117 may be unable to determine. The service information may also be associated with one or more services 109 that provide position-related information. Such a service may include a navigation service that provides navigational information to a UE 101 and/or a UD 117. A service may also include a tracking service that relays information regarding the position of a tracking probe to the invocation platform 103.

The invocation platform 103 processes the context information, the application information and the service information to determine whether the invocation conditions are satisfied. The invocation conditions may be satisfied according to specific context information or specific conditions associated with the application information and/or service information. For example, certain context information regarding locations may indicate that an invocation condition is satisfied, such as if a user is at a certain condition, during a certain time of day, etc. Certain application information regarding one or more functions may indicate that an invocation condition is satisfied, such as whether one or more functions are executed associated with the application. Certain service information regarding one or more functions of a service may indicate that an invocation condition is satisfied, such as if a tracking device is activated.

In step 403, the invocation platform 103 causes, at least in part, a presentation of at least one map at the at least one user interface. The at least one map may be a general map that includes information regarding, for example, transportation information, topology information, climate information, etc. The map may be adjustable to be different sizes and have different resolutions. The map may be thought of as a shell map or a container map that allows for the presentation of additional position-related information from the applications and/or services.

In step 405, the invocation platform 103 causes, at least in part, a modification of the at least one map based, at least in part, on the position-related information. The modification may include combining the information associated with the map with the position-related information associated with the one or more applications and/or services that are actively providing position-related information based on the satisfaction of the invocation conditions. In one embodiment, the modification may include the overlay of various layers of information pertaining to the position-related information from one or more applications and/or services. The modification may also include the adjustment of the map to center on a different location or have a different resolution or illustrated range. The modification may also include the illustration of various graphics on the map associated with points of interests, locations associated with available information (e.g., where information is available if the user is at a specific location), and the like. The modification of the map allows for the presentation of the position-related information of multiple applications and services at a single user interface rather than requiring a user to switch between multiple user interfaces. Having the modification based on the satisfaction of the invocation conditions also allows the invocation platform 103 to dynamically and automatically modify the map to present the position-related information without requiring input from the user.

Figure 5:
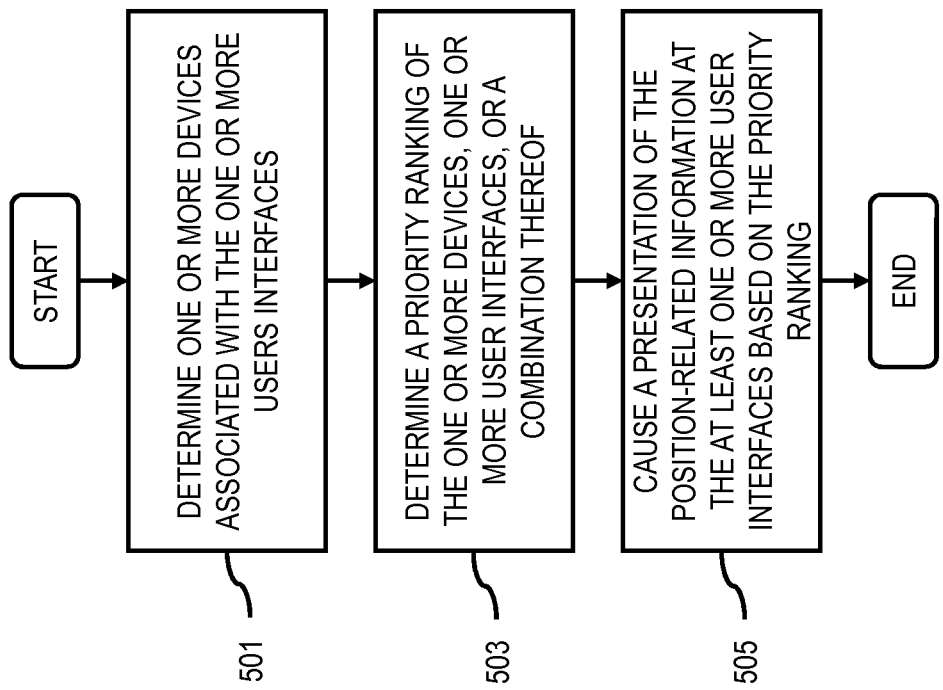
FIG. 5 is a flowchart of a process for providing a presentation of position-related information based on a priority ranking, according to one embodiment.

FIG. 5 is a flowchart of a process for providing a presentation of position-related information based on a priority ranking, according to one embodiment. In one embodiment, the invocation platform 103 performs the process 500 and is implemented in, for instance, a chip set including a processor and a memory as shown in FIG. 11. In step 501, the invocation platform 103 determines one or more devices associated with one or more user interfaces. The one or more devices, such as UE 101 and/or UD 117, may be associated with a single user and have been registered with the invocation platform 103. Because the devices are associated with the user, they are effectively associated with the user interface at which the invocation platform 103 presents the aggregated position-related information.

In step 503, the invocation platform 103 determines a priority ranking of the one or more devices, one or more user interfaces associated with the one or more devices, or a combination thereof. The priority ranking may have been established by the user at the time the user first registered the devices with the invocation platform 103. In one embodiment, the invocation platform 103 may have one or more default priority rankings For example, mobile devices may be ranked higher than traditionally stationary devices (e.g., terminals, desktops, etc.). In one embodiment, the priority ranking may be context dependent. Based on certain context information, device A may have a higher ranking than device B. Based on different context information, device A may have a lower ranking than device B. By way of example, a desktop may have a higher ranking than a mobile device when the context information of a user indicates that the user is in the position of the desktop (e.g., at home, at the office, etc.). However, where the context information indicates that the user is traveling, or is away from the position of the desktop, the desktop may have a lower priority ranking than the mobile device because the user is not able to use the desktop.

In step 505, the invocation platform 103 causes, at least in part, a presentation of the position-related information at the at least one or more user interfaces based, at least in part, on the priority ranking of the one or more devices, the one or more user interfaces of the devices, or a combination thereof. Accordingly, the invocation platform 103 may automatically determine to migrate the presentation of the aggregated position-related information to one or more devices and/or user interfaces of the devices based on the priority ranking The invocation platform 103 may migrate the position-related information based on one or more devices having a higher priority than currently used devices. By way of example, a user may be associated with two devices, a mobile phone and a desktop. The user may have defined the desktop as having a higher priority than the mobile phone to, for example, save resources of the mobile phone when the user is able to use the desktop. Thus, when the invocation platform 103 detects the desktop is on, the invocation platform 103 may migrate the presentation of the position-related information to the desktop from the mobile phone. Accordingly, the invocation platform 103 may dynamically provide position-related information at a user interface of a device, and may also dynamically change the device associated with the presentation of the position-related information as suited for the user of the devices.

Figure 6:
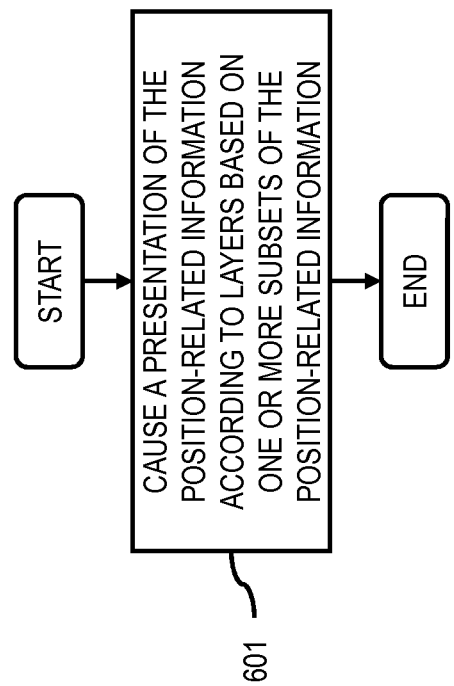
FIG. 6 is a flowchart of a process for presenting layers of position-related information, according to one embodiment.

FIG. 6 is a flowchart of a process for presenting layers of position-related information, according to one embodiment. In one embodiment, the invocation platform 103 performs the process 600 and is implemented in, for instance, a chip set including a processor and a memory as shown in FIG. 11. In step 601, the invocation platform 103 may cause, at least in part, a presentation of the position-related information according to one or more layers based, at least in part, on the one or more subsets of information. A map used by the invocation platform 103 may act as a background image upon which various layers of position-related information are aggregated and overlaid on the background map image. For instance, a service may provide position-related information to the invocation platform 103 associated with tracking a person. This position-related information may be presented at the user interface as a first layer above the background map image. Further, a navigation system may provide directional information associated with a route between two locations. The invocation platform 103 may present this position-related information as a second layer above the background map image. The first layer and the second layer may be layered on top of each other so that both layers are visible. In one embodiment, where position-related information associated with the layers overlap, the invocation platform 103 may alter the rendering of the information to signify the overlapping of information. In one embodiment, the invocation platform 103 may instead display the position-related information associated with the application or service that has the highest priority ranking By presenting the information as different layers, the invocation platform 103 may present position-related information from many different sources (e.g., applications and services) while still distinguishing the information from other applications and services. The invocation platform 103 may distinguish the position-related information by any visual approach that is compatible with the display of the UE 101 or UD 117. For example, the different layers may be distinguished by different colors, different patterns, or combinations thereof.

Figure 7:
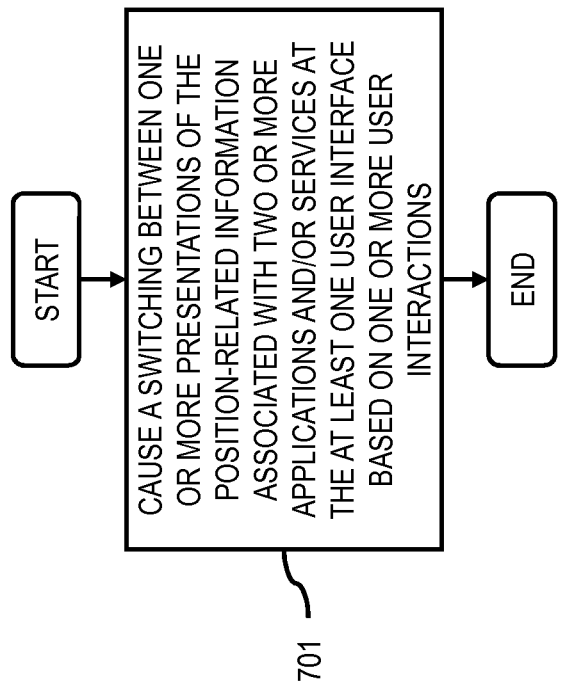
FIG. 7 is a flowchart of a process for switching between presentations of position-related information, according to one embodiment.

FIG. 7 is a flowchart of a process for switching between presentations of position-related information, according to one embodiment. In one embodiment, the invocation platform 103 performs the process 700 and is implemented in, for instance, a chip set including a processor and a memory as shown in FIG. 11. In step 701, the invocation platform 103 causes, at least in part, a switching between one or more presentations of the position-related information associated with two or more of the one or more applications, the one or more services, or a combination thereof at the at least one user interface based, at least in part, on one or more user interactions. As discussed above, the invocation platform 103 may present aggregated position-related information associated with different applications and/or services at a user interface of a device. The invocation platform 103 may present the aggregated position-related information at the same time such that the information is, for example, layered on a map with all of the various layers presented at the same time. However, the invocation platform 103 may allow the user to switch between the different position-related information by, for example, switching through the various layers. In one embodiment, the user interface may include one or more indicators that a user may select to switch between the different position-related information. The indicators may be, for example, tabs with each tab associated with position-related information associated with one application or one service. Thus, the user's interactions may be the user selecting the tabs that correspond to the different position-related information. Although discussed as tabs, the indicators may be any graphical indication that a user may select to initiate the action of selecting between different position-related information. Based on the switching, the user may select the presentation of all of the position-related information associated with all active applications and services. Additionally, the user may select the presentation of a subset of the position-related information associated with a subset of the applications and services. In one embodiment, the subset may include one application or service of the applications and services that may be actively providing position-related information to the invocation platform 103 for presentation at the user interface.

Figure 8:
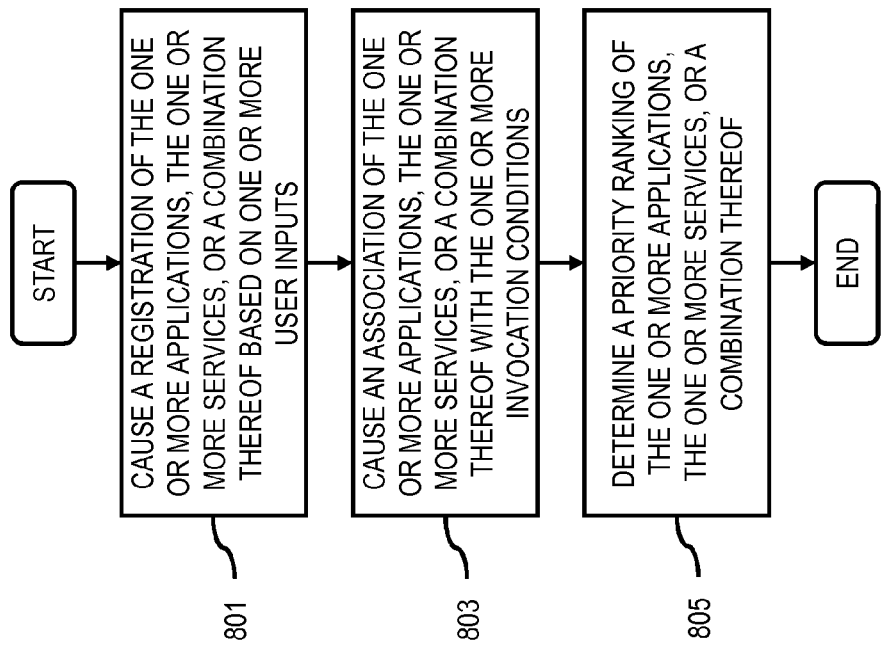
FIG. 8 is a flowchart of a process for associating one or more invocation conditions with registered applications and/or services, according to one embodiment

FIG. 8 is a flowchart of a process for associating one or more invocation conditions with registered applications and/or services, according to one embodiment. In one embodiment, the invocation platform 103 performs the process 800 and is implemented in, for instance, a chip set including a processor and a memory as shown in FIG. 11. In step 801, the invocation platform 103 causes, at least in part, a registration of the one or more applications, the one or more services, or a combination thereof based, at least in part, on one or more user inputs. In one embodiment, the one or more user inputs may be associated with a user selecting one or more applications and/or services from a list of applications and services that have been previously registered with the invocation platform 103. In one embodiment, the one or more user inputs may be associated with a user registering one or more applications and/or services. Where the user registers one or more applications and/or services with the invocation platform 103, the user may provide the information as discussed above, such as authentication information, information regarding the user interface, and information that is requested by the applications and/or services.

In step 803, the invocation platform 103 causes, at least in part, an association of the one or more applications, the one or more services, or a combination thereof with the one or more invocation conditions. Where the applications and services were previously registered with the invocation platform 103 but not registered or associated with a particular user, the invocation conditions may have already been associated with the applications and services. Where the applications and services were not previously registered with the invocation platform 103, the user may assign the invocation conditions to the applications and/or services when the user registers the applications and/or services. By way of example, for applications that are associated with tracking probes (e.g., GPS enabled watch), the user may assign an invocation condition as when the tracking probes turns on, starts emitting location information, or a combination thereof. For one or more other applications, the user may assign any type of information as invocation conditions, such as when an application is executed, when a reminder occurs associated with an application, when an alert occurs associated with an application, etc. By the user assigning the invocation conditions for the applications and services, the invocation platform 103 may associate the invocation conditions with the applications and/or services.

In step 805, the invocation platform 103 determines a priority ranking of the one or more applications, the one or more services, or a combination thereof and determines the presentation of the position-related information based, at least in part, on the priority ranking. In one embodiment, the invocation platform 103 will present at a user interface an aggregation of the position-related information from one or more applications, one or more services, or a combination thereof. Thus, a priority ranking of the applications and/or services is not necessary. However, in one embodiment, the invocation platform 103 may present only certain position-related information from applications and/or services based on a priority ranking, where the position-related information is based on applications and/or services having a higher rank than other applications and/or services. For instance, position-related information from two different applications may vary in the location of the information with respect to the map such that the position-related information cannot be displayed at the same time at a specified resolution (e.g., the centers of the position-related information are too far apart. Thus, the invocation platform 103 may determine what position-related information to present at the user interface based on the priority ranking of the applications. If application X has a higher priority ranking than application Y, the invocation platform 103 will present the position-related information associated with application X. However, the invocation platform 103 will provide one or more indicators (e.g., tabs, icons, etc.) that will allow a user to switch to the position-related information associated with application Y within the same user interface as the presentation associated with application X, as desired.

Figure 9:
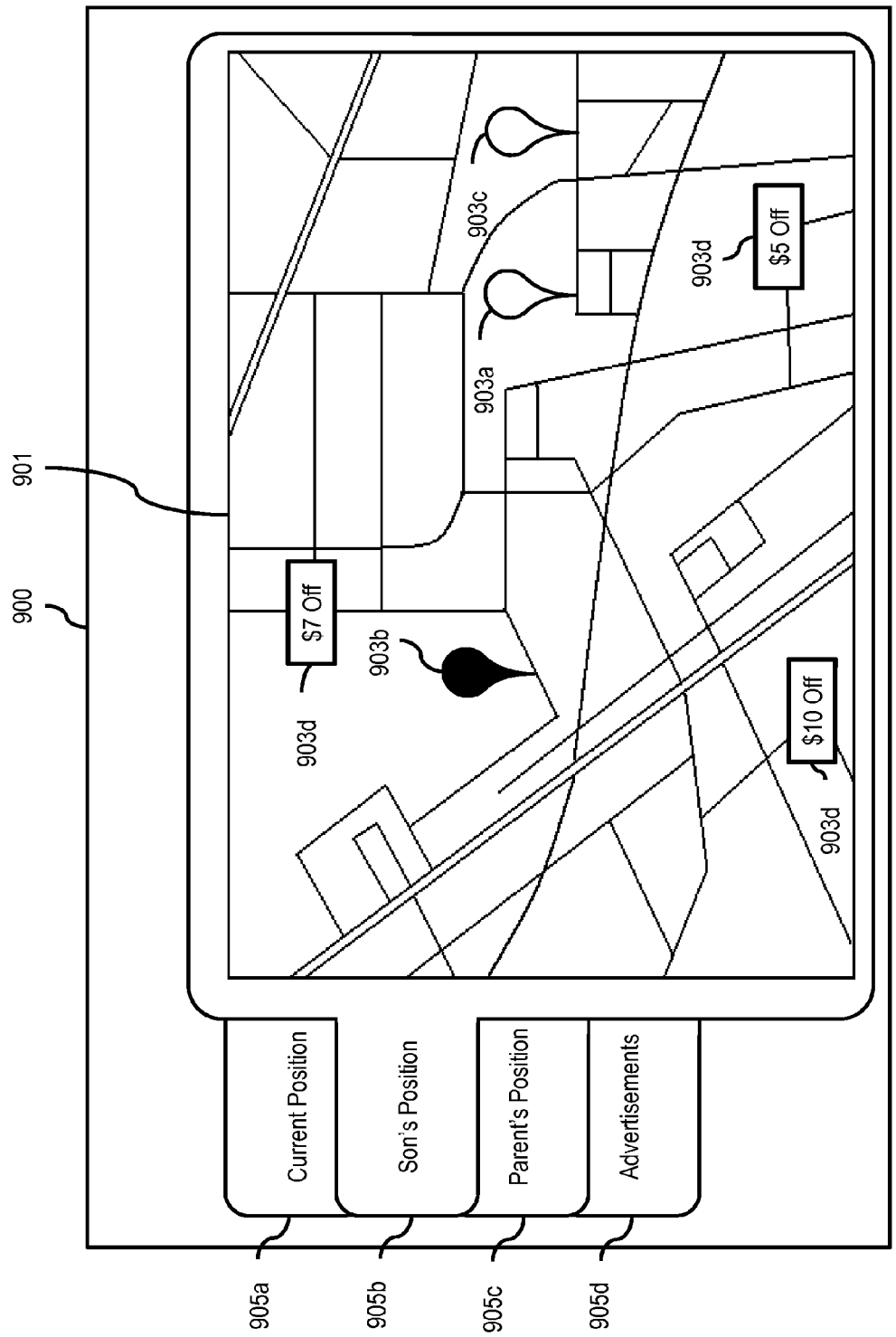
FIG. 9 is a diagram of a user interface utilized in the processes of FIGS. 3-8, according to one various embodiment.

FIG. 9 is a diagram of a user interface 900 utilized in the processes of FIGS. 3-8, according to one embodiment. The user interface 900 may be a user interface associated with a UE 101 and/or a UD 117. The user interface 900 may display a map 901 that illustrates a specific geographical area. Information used to generate the map 901 at the user interface 900 may be stored at a local storage (e.g., storage 119) associated with the UE 101 and/or the UD 117. As illustrated, the user interface 900 may include multiple markers 903 (e.g., 903a-903d) associated with position-related information presented relative to the map 901. The markers 903 may correspond to position-related information provided by one or more applications and/or services through the invocation platform 103. By way of example, marker 903a may represent the current position of the UE 101 or UD 117 associated with the user interface 900. Markers 903b and 903c may represent position-related information from one or more services 109 that provide tracking based on tracking probes. Markers 905d may represent advertisement information that is correlated to specific positions within the map associated with locations of, for example, stores that are associated with the advertisements. In one embodiment, the current position of the UE 101 may be determined based on an application 111a executed at the UE 101, which is transmitted to the invocation platform 103 and presented at the user interface 900. The application 111a may be represented at the user interface by the tab 905a. However, the tab 905a may be any type of indicator, not necessarily in the form of a tab. The position associated with marker 903b may be based on service information provided by one or more services 109 running at the services platform 107. Such a service may be, for example, a service that provides the location of a GPS enabled watch. The service may be represented by the tab 905b. Because the tab 905b is currently selected, as represented by the tab 905b being in the foreground with respect to the other tabs 905, the marker 903b may be darkened, as illustrated. Similarly, the position associated with marker 903c may be based on service information provided by one or more services 109 running at the services platform 107. The service may be represented by the tab 905c.

The positions associated with the markers 903d may be based on service information provided by one or more advertisement services 109 running at the services platform 107. The service may be represented by the tab 905d.

The application and services represented by the tabs 905 may have a priority ranking such that the position-related information associated with the application and services is presented according to the ranking In one embodiment, the marker 903b may be darkened and the tab 905b may be in the foreground of the other tabs 905 based on the service associated with the tab 905b having the highest priority among the application and services. However, in one embodiment, the tab 905b may be in the foreground simply because a user associated with the user interface 900 has selected the tab 905b.

The markers 903 may be associated with different layers that are overlaid over the map 901. Thus, in one embodiment, when the corresponding tab 905 is selected for the markers 903, only the layer associated with the selected marker (e.g., 903d, 903b, 903c, or 903d) may be overlaid on the map at a time. Thus, rather than darkening the marker 903b with respect to the other markers 903a and 903c, the marker 903b may be the only marker overlaid on the map 901.

Thus, based on the foregoing, the invocation platform 103 allows for the presentation of the aggregated position-related information from the application and services associated with tabs 905 at a single user interface 900 rather than requiring the user to navigate to different user interfaces for each different application or service that provides position-related information. Further, the markers 903 may dynamically and automatically appear within the user interface as the invocation conditions associated with the applications and/or services associated with the markers 903 are satisfied. By way of example, prior to the GPS enabled watch associated with the marker 903b turning on, the marker 903b and the tab 905b are not presented at the user interface 900. However, as the GPS enabled watch is turned on, the invocation platform 103 may determine that an invocation condition is satisfied and subsequently illustrate the marker 903b and the tab 905b on the user interface 900 without requiring any action on the part of the user. When the GPS enabled watch is turned off, the invocation condition is no longer satisfied and the invocation platform 103 will cause the removal of the marker 903b and the tab 905b because the position-related information is no longer being provided by the corresponding service.

The processes described herein for providing aggregated position-related information at a user interface based on invocation conditions may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
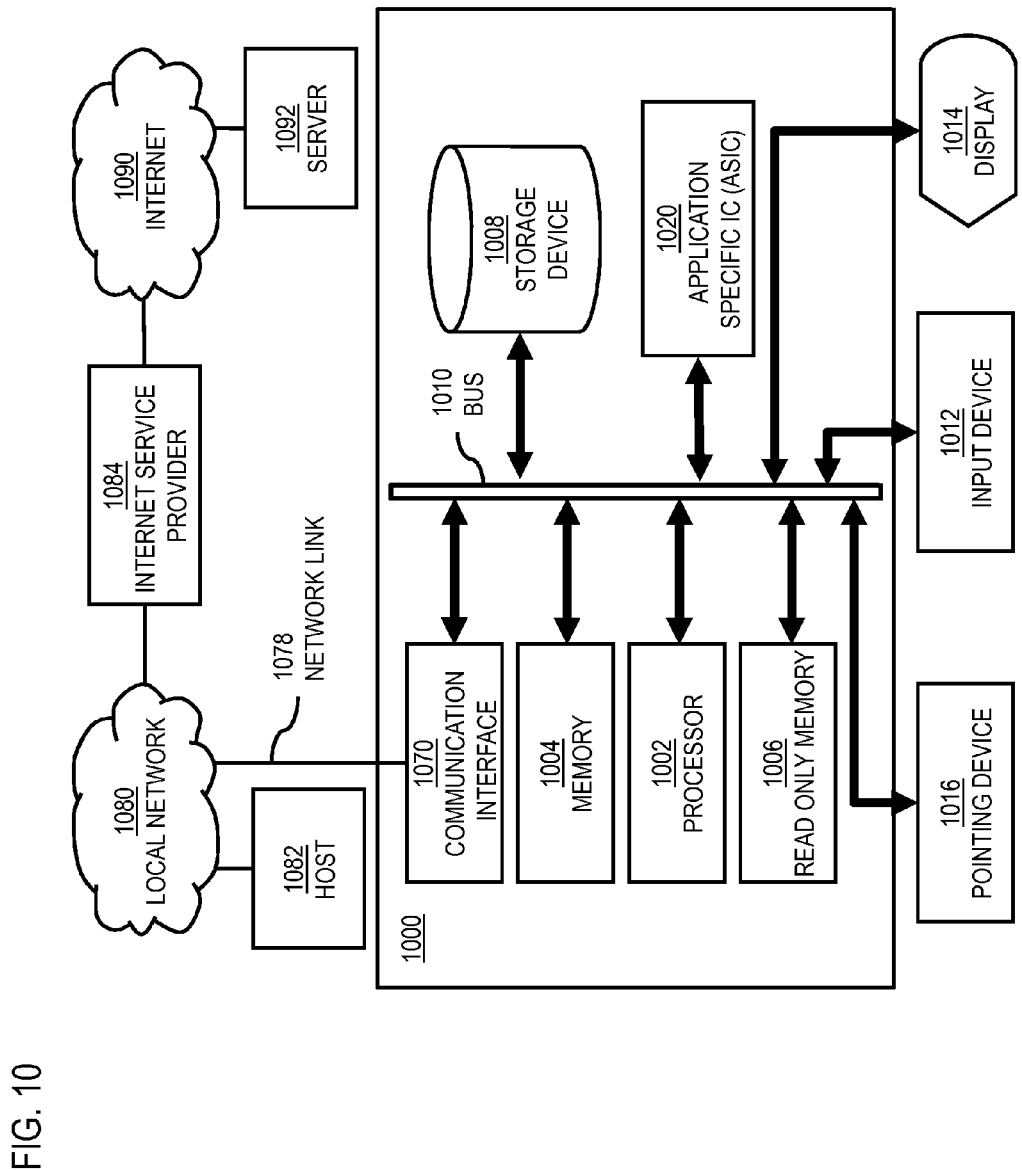
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide aggregated position-related information at a user interface based on invocation conditions as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing aggregated position-related information at a user interface based on invocation conditions.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing aggregated position-related information at a user interface based on invocation conditions. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing aggregated position-related information at a user interface based on invocation conditions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing aggregated position-related information at a user interface based on invocation conditions, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing aggregated position-related information at a user interface of the UE 101 based on invocation conditions.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a Compact Disc-Read Only Memory (CD-ROM), Compact Disc Re-Writable (CDRW), Digital Versatile Disc (DVD), any other optical medium, punch cards, paper tape, optical mark sheets, any other physical medium with patterns of holes or other optically recognizable indicia, a Random Access Memory (RAM), a Programmable Read Only Memory (PROM), an Erasable Programmable Read Only Memory (EPROM), a flash Erasable Programmable Read Only Memory (FLASH-EPROM), an Electrically Erasable Programmable Read Only Memory (EEPROM) a flash memory, any other memory chip or cartridge, a carrier wave, or any other medium from which a computer can read.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide aggregated position-related information at a user interface based on invocation conditions as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing aggregated position-related information at a user interface based on invocation conditions.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide aggregated position-related information at a user interface based on invocation conditions. The memory 1105 also stores the data associated with or generated by the execution of the inventive steps.

Figure 12:
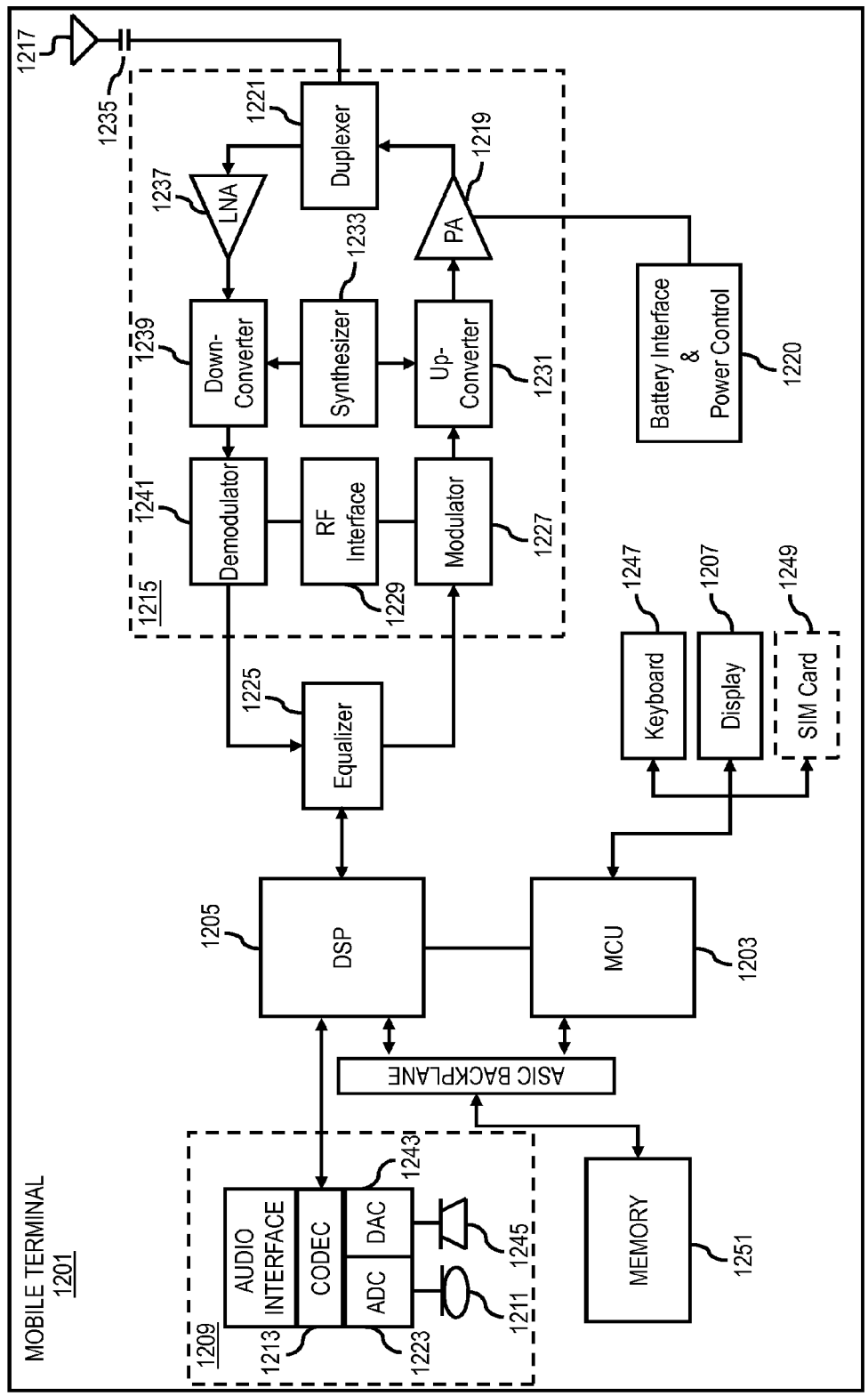
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing aggregated position-related information at a user interface based on invocation conditions. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing aggregated position-related information at a user interface based on invocation conditions. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide aggregated position-related information at a user interface based on invocation conditions. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, via a processor, at least two of at least one application and at least one service that provide position-related information, each at least one application and each at least one service that provides position-related information having a map associated therewith for displaying the position-related information and each map is different from one another, and said each at least one application and said each at least one service that provides position-related information being registered with an invocation platform, different from a user device,
   wherein each at least one application that provides position-related information and each at least one service that provides position-related information are different from one another and provide different position-related information;
   determining, via the processor, at least one invocation condition associated with at least one of the position-related information, the at least one application, and the at least one service;
   causing, at least in part, via the processor, a presentation of at least one user interface that aggregates the position-related information from the at least two of the at least one application and the at least one service based, at least in part, on the at least one invocation condition,
   wherein said each at least one application and said each at least one service that provides position-related information is configured to provide the different position-related information via a different user interface, and
   wherein the invocation platform at which said each at least one application and said each at least one service is registered is configured to aggregate the different position-related information corresponding to each different map for presentation at the at least one user interface;
   determining at least two devices having respective device user interfaces associated therewith;
   determining a priority ranking of the at least two devices; and
   causing, at least in part, via the processor, a presentation of the position-related information via the at least one user interface at the device user interface of one of the at least two devices based, at least in part, on the priority ranking.

2. A method of claim 1, further comprising:
   causing, at least in part, via the processor, a presentation of at least one map at the at least one user interface; and
   causing, at least in part, via the processor, a modification of the at least one map based, at least in part, on the position-related information.

3. A method of claim 2, further comprising:
causing, at least in part, via the processor, a processing of at least one of context information, application information associated with the at least one application, and service information associated with the at least one service to determine whether the at least one invocation condition is satisfied.

4. A method of claim 3, wherein the context information is associated with at least one of at least one device and at least one other user of at least one other device.

5. A method of claim 1, further comprising:
causing, at least in part, via the processor, a presentation of the position-related information according to at least one layer based, at least in part, on the at least one subset of information.

6. A method of claim 1, further comprising:
causing, at least in part, via the processor, a switching between at least two presentations of the position-related information associated with two of the at least one application and the at least one service at the at least one user interface based, at least in part, on at least one user interaction.

7. A method of claim 1, further comprising:
determining a priority ranking of at least two of the at least one application and the at least one service registered with the invocation platform,
wherein the presentation of the position-related information is based, at least in part, on the priority ranking.

8. A method of claim 1, further comprising:
causing, at least in part, the registration of the at least one application and the at least one service based, at least in part, on at least one user input; and
causing, at least in part, via the processor, an association of at least one of the at least one application and the at least one service with the at least one invocation condition.

9. A method of claim 1, wherein the at least one user interface is based, at least in part, on at least one locally stored map.

10. An apparatus comprising:
at least one processor; and
at least one memory including computer program code for at least one program,
the at least one memory and the computer program code configured to, with the at least one processor, cause the apparatus to perform at least the following,
determine at least two of at least one application and at least one service that provide position-related information, each at least one application and each at least one service that provides position-related information having a map associated therewith for displaying the position-related information and each map is different from one another, and said each at least one application and said each at least one service that provides position-related information being registered with an invocation platform, different from a user device,
wherein each at least one application that provides position-related information and each at least one service that provides position-related information are different from one another and provide different position-related information;
determine at least one invocation condition associated with at least one of the position-related information, the at least one application, and the at least one service;
cause, at least in part, a presentation of at least one user interface that aggregates the position-related information from the at least two of the at least one application and the at least one service based, at least in part, on the at least one invocation condition,
wherein each at least one application and each at least one service that provides position-related information is configured to provide the different position-related information via a different user interface, and
wherein the invocation platform at which said each at least one application and said each at least one service is registered is configured to aggregate the different position-related information corresponding to each different map for presentation at the at least one user interface;
determine at least two devices having respective device user interfaces associated therewith;
determine a priority ranking of the at least two devices; and
cause, at least in part, a presentation of the position-related information via the at least one user interface at the device user interface of one of the at least two devices based, at least in part, on the priority ranking.

11. An apparatus of claim 10, wherein the apparatus is further caused to:
cause, at least in part, a presentation of at least one map at the at least one user interface; and
cause, at least in part, a modification of the at least one map based, at least in part, on the position-related information.

12. An apparatus of claim 11, wherein the apparatus is further caused to:
at least one of (i) process and (ii) facilitate a processing of at least one of context information, application information associated with the at least one application, and service information associated with the at least one service to determine whether the at least one invocation condition is satisfied.

13. An apparatus of claim 12, wherein the context information is associated with at least one of at least one device and at least one other user of at least one other device.

14. An apparatus of claim 10, wherein the position-related information includes at least one subset of information, and the apparatus is further caused to:
cause, at least in part, a presentation of the position-related information according to at least one layer based, at least in part, on the at least one subset of information.

15. An apparatus of claim 10, wherein the apparatus is further caused to:
cause, at least in part, a switching between at least two presentations of the position-related information associated with at least two of the at least one application and the at least one service at the at least one user interface based, at least in part, on at least one user interaction.

16. An apparatus of claim 10, wherein the apparatus is further caused to:
determine a priority ranking of at least two of the at least one application and the at least one service registered with the invocation platform,
wherein the presentation of the position-related information is based, at least in part, on the priority ranking.

17. An apparatus of claim 10, wherein the apparatus is further caused to:
cause, at least in part, the registration of the at least one application and the at least service based, at least in part, on at least one user input; and
cause, at least in part, an association of at least one of the at least one application and the at least one service with the at least one invocation condition.

18. An apparatus of claim 10, wherein the at least one user interface is based, at least in part, on at least one locally stored map.

* * * * *